(12) United States Patent
Chen et al.

(10) Patent No.: US 7,166,799 B2
(45) Date of Patent: Jan. 23, 2007

(54) BEZEL MOUNTING ASSEMBLY

(75) Inventors: Yun Lung Chen, Tu-chen (TW);
DaLong Sun, Shenzhen (CN)

(73) Assignees: **Hong Fu Jin Precision Ind.
(Shenzhen) Co., Ltd.**, Shenzhen (CN);
Hon Hai Precision Ind. Co., Ltd.,
Tu-Cheng (TW)

( * ) Notice: Subject to any disclaimer, the term of this patent is extended or adjusted under 35 U.S.C. 154(b) by 311 days.

(21) Appl. No.: 10/942,175

(22) Filed: Sep. 15, 2004

(65) Prior Publication Data
US 2005/0057127 A1    Mar. 17, 2005

(30) Foreign Application Priority Data
Sep. 17, 2003    (TW) .............................. 92216669 U

(51) Int. Cl.
*H02G 3/08*    (2006.01)
(52) U.S. Cl. .......................... 174/50; 174/66; 174/520; 361/726; 312/223.2
(58) Field of Classification Search ................ 174/50, 174/66, 520; 361/679–683, 724–727; 312/223.1, 312/223.2, 265.5, 285–287; 220/4.02; 439/535; 292/19.91
See application file for complete search history.

(56) References Cited

U.S. PATENT DOCUMENTS

| 4,257,555 A * | 3/1981 | Neel ............................ 236/94 |
| 6,798,652 B1 * | 9/2004 | Wang et al. ................. 361/685 |
| 7,067,735 B1 * | 6/2006 | Murata ........................ 174/50 |

* cited by examiner

*Primary Examiner*—Dhiru R. Patel
(74) *Attorney, Agent, or Firm*—Wei Te Chung

(57) ABSTRACT

A bezel mounting assembly includes a front panel (10), a first operating member (20), a bezel (40) and a second operating member (70). The panel defines a plurality of slots (14). The first operating member is pivotally engaged with the panel, it includes a handle (22), the handle is connected with a pushing portion (34). The bezel forms a plurality of hooks (46, 48), one pair of hooks for primary connection respectively include a guiding block (61). The second operating member is rotatablely mounted to the bezel, it includes a driving portion (73) with a convex cam portion (76). The bezel is engaged with the panel by the hooks, in disassembly, the handle is rotated, then the pushing portion presses the cam portion of the second operating member, and the pressing arms push the guiding block and make the hooks deform, thereby detaching the bezel from the panel.

22 Claims, 5 Drawing Sheets

BEZEL MOUNTING ASSEMBLY

BACKGROUND OF THE INVENTION

1. Field of the Invention

The present invention relates to a bezel mounting assembly for a computer enclosure, and more particularly to a bezel mounting assembly with a simplified configuration for convenient use.

2. Description of the Related Art

A typical bezel mounting assembly is usually directlly mounted to a computer case with a plurality of screws. However, a screwdriver or other detaching toolings are required for installation orr removal of the screws, which causes inconvenience and time-comsuming issues in bezel disassembly process.

An improved conventional bezel mounting assembly with claspers is disclosed in Taiwan Patent application No. 85202167. The bezel mounting assembly comprises a chassis and a bezel. The chassis comprises two side walls and each side wall defines a pair of slots in a front portion therein. The bezel extends two pairs of hooks on respective side edges thereof. A buckling piece is formed between the pair of slots on the side wall of the chassis or between the pair of hooks on the bezel. The hooks are received in corresponding slots in the side walls of the chassis and the buckling pieces press the opposite component i.e., the bezel or the side walls of the chassis, so as to provide two fixing means from two opposite directions, thereby mounting the bezel to the chassis. But the conventional bezel mounting assembly disclosed therebefore only utilizes the hooks for bezel fixation. Althrough it is easy to put the hooks in corresponding slots, it is unduly inconvenient to detach the bezel from the chassis for the hooks hold correspongding edge of the slots so tightly that breaking off and deformation of the hooks are often occurred in bezel detaching process.

Another typical bezel mounting assembly is disclosed in U.S. Pat. No. 5,123,680. The bezel mounting assembly comprises a bezel and a computer casing. The computer casing comprises a front panel and the front panel defines a plurality of retain holes therein. A plurality of fasteners is engaged with the bezel and each fastener extends a plurality of resilient legs therefrom. Each leg forms an outward convex foot at a distal end. In assembly, the convex feet are pushed through corresponding retain holes, being slightly and temporarily deformed to go through the retain holes, then springing back and clasping the circumferencial edge of the retain holes, thereby mounting the bezel to the computer casing. However, all of the convex feet of the fasteners are firmed engaged with the retain holes, and more detaching force has to be provided to disassemble the bezel, which is unduly inconvenient. In addition, on the conditions discussed thereinbefore, frequent detaching of the bezel usually causes deformation of the convex feet and destroy the connection between the bezel and the computer casing.

SUMMARY OF THE INVENTION

Accordingly, an object of the present invention is to provide a bezel mounting assembly with a simplified configuration, and which is convenient to use.

To achieve the above object, a bezel mounting assembly comprises a front panel, a first operating member, a bezel and a second operating member. The panel defines a plurality of slots. The first operating member is pivotally engaged with the panel, it comprises a handle, the handle is connected with a pushing portion. The bezel forms a plurality of hooks, one pair of hooks for primary connection respectively comprise a guiding block. The second operating member is rotatablely mounted to the bezel, it comprises a driving portion with a convex cam portion. The bezel is engaged with the panel by the hooks, in disassembly, the handle is rotated, then the pushing portion presses the cam portion of the second operating member, and the pressing arms push the guiding block and make the hooks deform, thereby detaching the bezel from the panel.

Other objects, advantages and novel features of the present invention will be drawn from the following detailed description of preferred embodiment of the present invention with the attached drawings, in which:

DETAILED DESCRIPTION OF THE INVENTION

Figure 1:
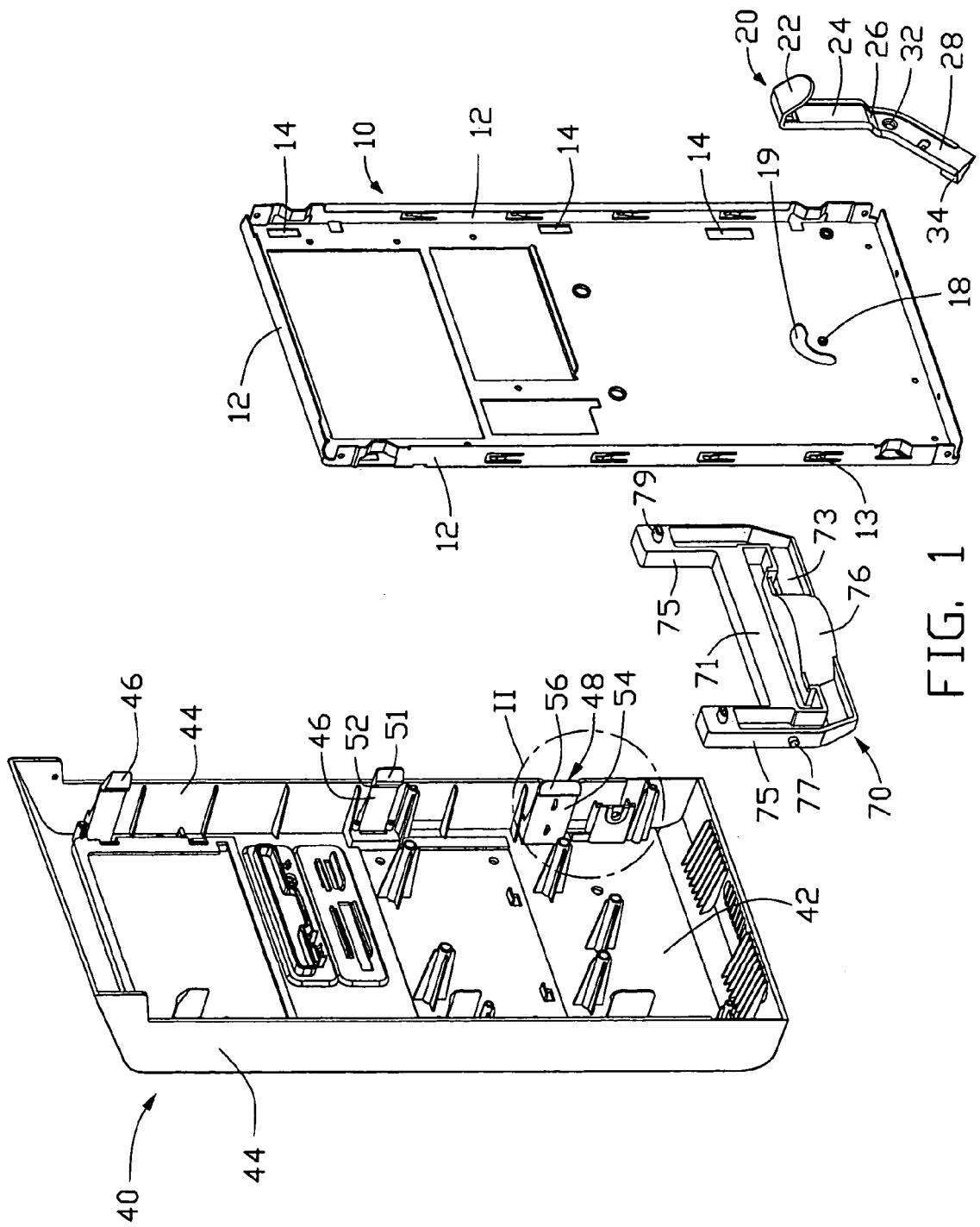
FIG. 1 is an exploded, isometric view of a bezel mounting assembly in accordance with a preferred embodiment of the present invention commprising a bezel, a front panel, a first operating member and a second operating memberr.
Figure 2:
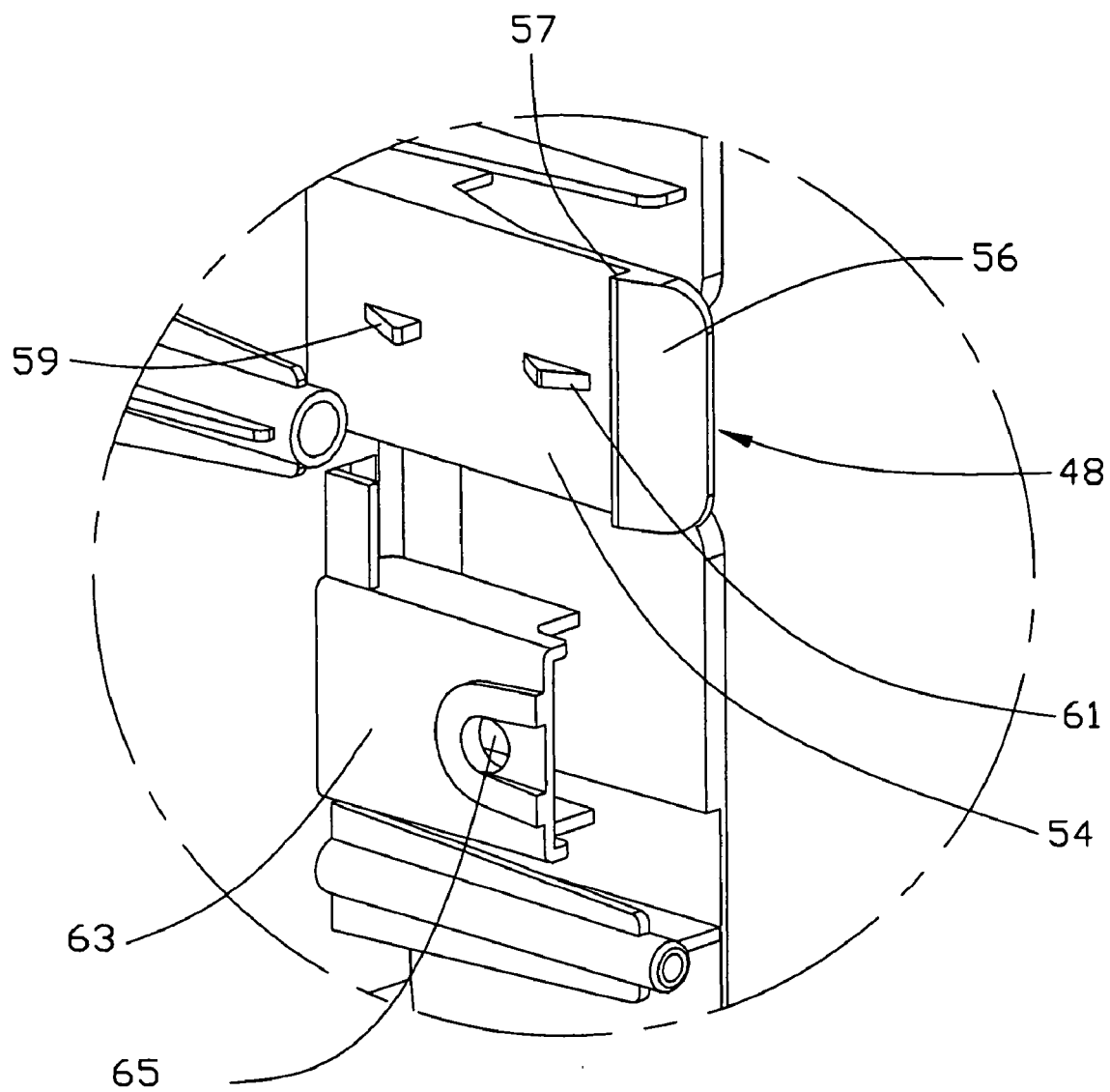
FIG. 2 is an enlarged view of an encircled portion II of FIG. 1, showing details of a hook and a rotating base of the bezel.

Referring to FIGS. 1 and 2, a bezel mounting assembly in accordance with the preferred embodiment of the present invention comprises a front panel 10, a first operating member 20 rotatablely mounted to the front panel 10, a bezel 40 and a second operating member 70 rotatablely mounted to the bezel 40.

The front panel 10 is rectangular, and forms a front portion of a computer chasiss (not shown). edges of the front panel 10 are bent rearwardly to respectively form a flange 12 thereof. Two flanges 12 at opposite sides of the panel 10 respectively form a plurality of resilient fingers 13 for preventing electro magnetic interference (EMI). The panel 10 defines three slots 14 longitudinally along each side flange 12. The panel 10 further defines a mounting hole 18 for pivotally riveting the first operating member 20, and an arc-shaped guiding slot 19.

The first operating member 20 forms a handle 22, an end of the handle 22 successively extends a first connecting portion 24, a slantwise second connecting portion 26 and a third connecting poriton 28. The third connecting portion 28 defines a mounting aperture 32 corresponding to the mounting hole 18 in the panel 10 for riveting the first operating member 20 with the panel 10. The third connecting portion 28 forms a convex pushing portion 34 towards the opposite side of the handle 22.

The bezel 40 comprises a base plate 42 and two side walls 44 extending rearwardly from opposite sides of thee base plate 42. the bezel 40 longitudinally extends a plurality of hooks 46, 48 along the side walls 44. The hooks 46 at the top and middle portions of the base plate 42 function as a subsidiary connection between the bezel 40 and the panel 10, and each hook 46 forms a barb 51 at a distal end thereof and an inclined locking face 52 under the barb 51. The hooks 48 at the lower portion of the side walls 44 function as a primary connection between the bezel 40 and the panel 10, and each hook 48 comprises a supporting plate 54. The supporting wall 54 extends a barb 56 at a distal end thereof. A connecting face 57 is perpendicularly formed between the barb 56 and the supporting plate 54 so as to provide a firm connection between the bezel 40 and the panel 10.

The supporting plate 54 inwardly forms a convex block 59 for restraining the motion of the second operating member and a triangular guiding block 61. The guiding blcok 61 forms an incline (not labeled) thereof. Each side wall 44 of the bezel 40 respectively forms a rotating base 63 under the lower hook 48. Each rotating base 63 defines a through hole 65 for rotatablely connecting with the second operating member 70.

Figure 3:
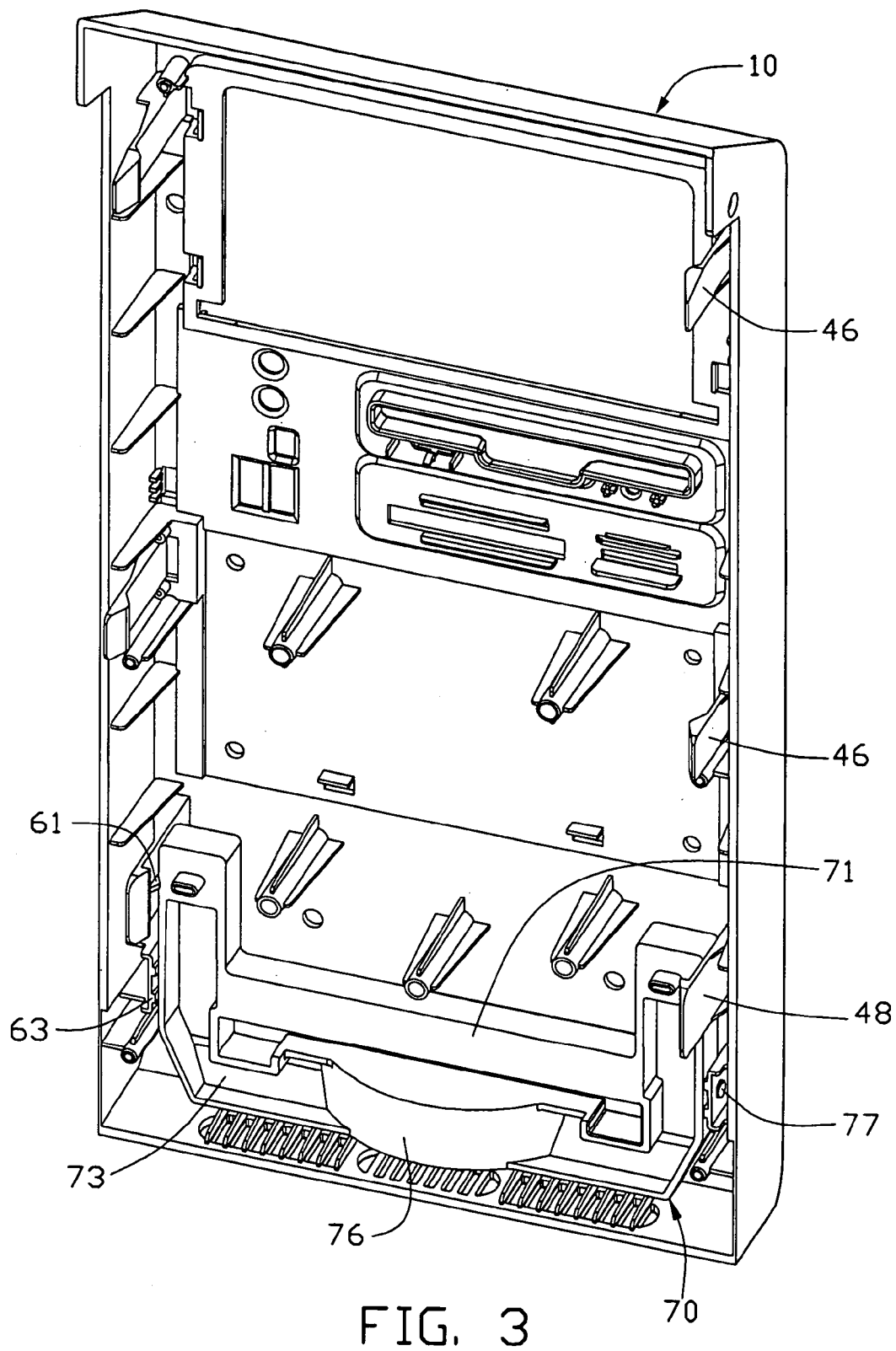
FIG. 3 is an assembled view, showing the assembled relationship between the bezel and the second operating member.

Referring to FIGS. 1–3, the second operating member 70 comprises a base portion 71, a driving portion 73 connected with the base portion 71, and two pressing arms 75 extending from two distal ends of the base portion 71. A pair of shafts 77 is outwardly formed from two sides of the pressing arms 75, corresponding to the through hole 65 of the rotating base 63. The driving portion 73 is substantially paralleled with the base portion 71, and forms a convex cam portion 76 in the middle thereof. Each pressing arm 75 perpendicularly extends a pressing block 79 from a free end thereof.

Figure 4:
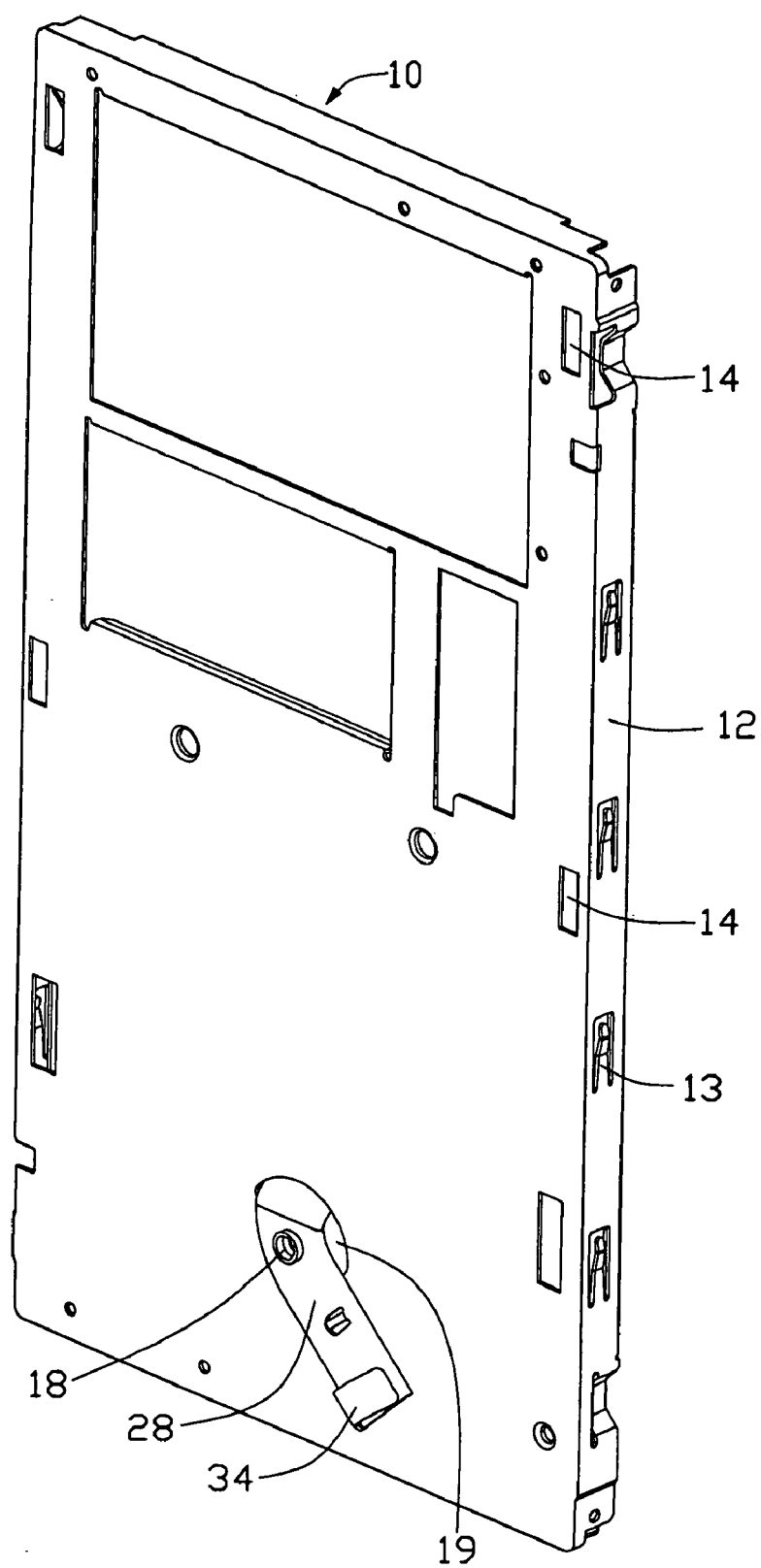
FIG. 4 is an assembled view, showing the assembled relationship between the front panel and the first operating member.
Figure 5:
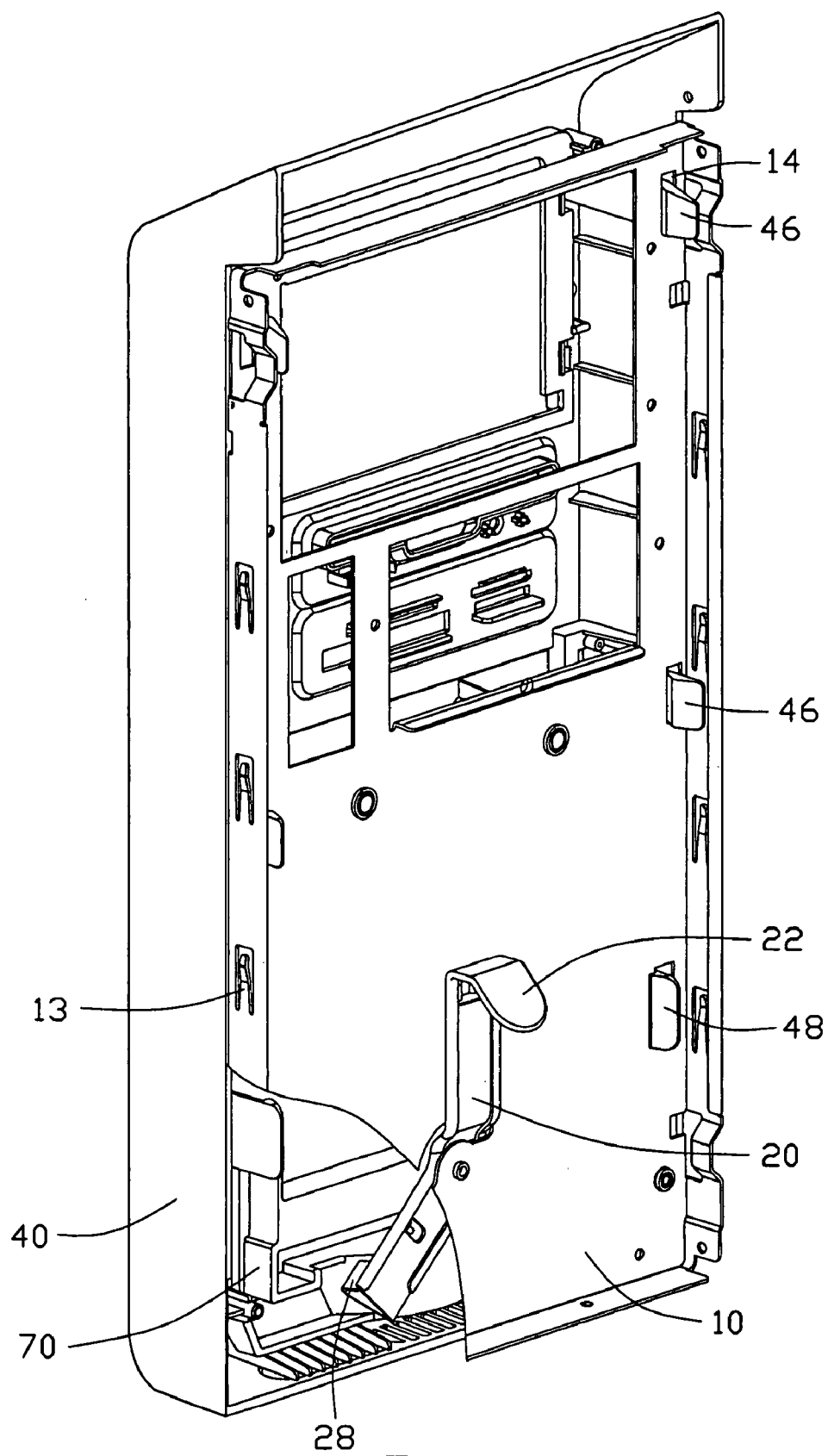
FIG. 5 is an assembled view of FIG. 1, with partly cut off for better illustration.

Referring to FIGS. 3–5, in assembly, The first operating member 20 penetrates through the guiding slot 19 in the panel 10 and pivotally connected with the panel 10 by riveting the mounting hole 18 and the mounting aperture 32 together. The first operating member 20 is mounted to the panel 10 wherein the first connecting portion 24 is engaged behind the panel 10 and the third connecting portion 28 is engaged in front of the panel 10, the slantwise second connecting portion 26 gets through the guiding slot 19 and connects the first and second connecting portion 24, 28.

The second operating member 70 is rotatablely engaged with the bezel 40 with the shaft 77 received in the through holes 65 of the rotating bases 63 and each pressing arm being located between the corresponding convex block 59 and guiding block 61. The hooks 46, 48 of the bezel 40 respectively get through the slots 14 in the panel 10 and clasp an edge of each slot 14, thereby mounting the bezel 40 to the panel 10. On this situation, the first operating member 20 is in its free state, with the pushing portion 34 of the third connecting portion 28 lying beside the cam portion 76 of the second operating member 70.

In disassembly, grab the handle 22 to rotate, the first operating member 20 is rotated around the mounting hole 18 of the panel 10, which have the third connecting portion 28 rotate in a first surface substantially paralleled to the panel 10. The convex pushing portion 34 of the third connecting portion 28 is thereby moved to press the cam portion 76 toward the bezel 40 in a second surface substantially perpendicular to the first surface, which at the same time have the second operating member 70 rotate around the shafts 77. Simultaneously, the pressing arms 75 move away from the bezel until the pressing block leans agaist the panel 10, in the course of the rotation, the pressing arms 75 extert force to the guiding blocks 61 and drive the supporting plates 54 outwardly, thereby the bezel 40 is detached from the panel 10.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A bezel mounting assembly comprising:
   a front panel defining a plurality of slots along opposite side edges and a guiding slot in a lower portion thereof;
   a first operating member extending in the guiding slot and pivotally engaged with the panel, the first operating member comprising a handle located at a rear of the panel, and a pushing portion located at a front of the panel;
   a bezel forming a plurality of hooks along side edges corresponding to the slots in the panel, and a pair of rotating bases at a bottom portion thereof, the hooks at the bottom portion of the bezel respectively comprising a guiding block; and
   a second operating member rotatablely mounted to the bezel at the rotating bases, the second operating member comprising a base portion, a driving portion and two pressing arms extending from the distal ends of the base portion, the driving portion forming a convex cam portion;
   wherein the bezel is engaged with the panel by the hooks, in disassembly, the handle is rotated, then the pushing portion of the first operating member presses the cam portion of the second operating member, the pressing arms push the guiding blocks and have the hooks deviate from original position, thereby detaching the bezel from the panel.

2. The bezel mounting assembly as claimed in claim 1, wherein the hooks forming the guiding blocks each comprise a supporting wall and the guiding block is formed on the supporting wall.

3. The bezel mounting assembly as claimed in claim 2, wherein the supporting wall of the hook further forms a convex block for restraining the motion of the second operating member.

4. The bezel mounting assembly as claimed in claim 2, wherein the supporting wall forms a barb at a distal end thereof.

5. The bezel mounting assembly as claimed in claim 4, wherein the barb forms a connecting face vertically jointing the supporting wall to provide a firm connection between the bezel and the panel.

6. The bezel mounting assembly as claimed in claim 1, wherein other pairs of hooks without guiding block respectively forms a barb at a distal end thereof, and each barb forms an inclined locking face.

7. The bezel mounting assembly as claimed in claim 1, wherein the front panel defines a mounting hole for engaging the first operating member with the panel.

8. The bezel mounting assembly as claimed in claim 1, wherein the rotating base on the bezel defines a through hole for pivotally engaging the second operating member.

9. The bezel mounting assembly as claimed in claim 8, wherein two distal ends of the base portion of the second operating member respectively extend a shaft received in the through hole of the rotating base.

10. The bezel mounting assembly as claimed in claim 1, wherein the handle of the first operating member successively extends a first connecting portion, a second connecting portion and a third connecting portion.

11. The bezel mounting assembly as claimed in claim 10, wherein the third connecting portion defines a mounting aperture corresponding to the mounting hole of the panel near the second connecting portion in order to pivotally connect the first operating member with the panel.

12. A bezel mounting assembly comprising:
a bezel forming a plurality of hooks along opposite side edges and a pair of rotating bases at a bottom portion thereof, hooks near the bottom portion of the bezel comprising a supporting wall, the supporting wall forming a barb at a distal end and a guiding block, the bezel further comprising a pivotal second operating member, the second operating member comprising a base portion, a driving portion and two pressing arms extending from the distal ends of the base portion, the driving portion forming a convex cam portion; and
a front panel defining a plurality of slots for receiving the hooks on the bezel and a guiding slot in a lower portion, a first operating member received in the guiding slot and pivotally connected with the panel, the first operating member comprising a handle located in a rear of the panel, and a pushing portion located in a front of the panel;
wherein the bezel is engaged with the panel by the hooks, in disassembly, the handle is rotated, then the pushing portion of the first operating member presses the cam portion of the second operating member, the pressing arms push the guiding block and have the hooks deviate from original position, thereby detaching the bezel from the panel.

13. The bezel mounting assembly as claimed in the claim 12, wherein the bezel forms a pair of rotating bases on the lower portin thereof.

14. The bezel mounting assembly as claimed in the claim 13, wherein each rotating base defines a through hole for engaging the base portion of the second operating member.

15. The bezel mounting assembly as claimed in the claim 14, wherein two distal ends of the base portion of the second operating member respectively extend a shaft received in the through hole of the rotating base.

16. The bezel mounting assembly as claimed in the claim 12, wherein the handle of the first operating member successively extends a first connecting portion, a second connecting portion and a third connecting portion.

17. The bezel mounting assembly as claimed in the claim 16, wherein the third connecting portion of the first operating member defines a through hole corresponding to that of the panel for rotatablely riveting the first operating member to the panel.

18. The bezel mounting assembly as claimed in the claim 12, wherein the supporting wall of the hooks comprising the guiding block forms a convex block for for restraining the motion of the second operating member.

19. The bezel mounting assembly as claimed in the claim 12, wherein the pressing arms of the second operating member respectively extend a pressing block.

20. The bezel mounting assembly as claimed in the claim 12, wherein the panel defines a mounting hole under the guiding slot therein.

21. The bezel mounting assembly as claimed in the claim 12, wherein the hooks without guiding block respectivley form a barb at a distal end thereof and the barb forms an inclined locking face joint with the supporting wall.

22. A bezel mounting assembly comprising:
a panel defining a plurality of slots in side portions and a guiding slot in a lower portion, a first operating member extending through the panel in the guiding slot and rotatable in a first surface; and
a bezel forming a plurality of hooks received in the slots of the panel, one pair of the hooks forming a vertical connecting face to provide primary connection and the other hooks forming an inclined clocking face to provide subsidiary connection, a second operating member engaged with the bezel near the first operating member and rotatable in a second surface substantially perpendicular to the first surface of the first operating member;
wherein the bezel is engaged with the panel by the hooks, in disassembly, the first operating member is rotated in the first surface and the first operating member pushes the second operating member on the bezel to rotate in the second surface, thereby detaching the hooks for primary connection.

* * * * *